United States Patent
Liao et al.

(10) Patent No.: US 10,211,006 B2
(45) Date of Patent: Feb. 19, 2019

(54) ILLUMINATED KEYSWITCH

(71) Applicants: DARFON ELECTRONICS (SUZHOU) CO., LTD., Suzhou, Jiangsu Province (CN); DARFON ELECTRONICS CORP., Taoyuan (TW)

(72) Inventors: Rui-Ming Liao, Taoyuan (TW); Chih-Chung Yen, Taoyuan (TW); Chia-Hung Liu, Taoyuan (TW)

(73) Assignees: DARFON ELECTRONICS (SUZHOU) CO., LTD., Suzhou, Jiangsu Province (CN); DARFON ELECTRONICS CORP., Taoyuan (TW)

( * ) Notice: Subject to any disclaimer, the term of this patent is extended or adjusted under 35 U.S.C. 154(b) by 95 days.

(21) Appl. No.: 15/404,212

(22) Filed: Jan. 12, 2017

(65) Prior Publication Data
US 2017/0221652 A1 Aug. 3, 2017

(30) Foreign Application Priority Data
Feb. 2, 2016 (TW) .................. 105103251

(51) Int. Cl.
*F21V 8/00* (2006.01)
*H01H 13/02* (2006.01)
(Continued)

(52) U.S. Cl.
CPC ......... *H01H 13/023* (2013.01); *G02B 6/0006* (2013.01); *G02B 6/0008* (2013.01);
(Continued)

(58) Field of Classification Search
CPC ....... H01H 9/18; H01H 13/023; G02B 6/0006
See application file for complete search history.

(56) References Cited

U.S. PATENT DOCUMENTS

| 4,002,873 A | * | 1/1977 | Lewandowski | H01H 13/023 200/314 |
| 4,017,700 A | * | 4/1977 | West | H01H 13/50 200/314 |

(Continued)

FOREIGN PATENT DOCUMENTS

| CN | 1652269 A | 8/2005 |
| CN | 103107039 A | 5/2013 |

(Continued)

*Primary Examiner* — Jong-Suk (James) Lee
*Assistant Examiner* — Eric T Eide
(74) *Attorney, Agent, or Firm* — Winston Hsu

(57) ABSTRACT

An illuminated keyswitch includes a base, a keycap, a lift mechanism, and a light source. The keycap includes a cap body and a light guiding rod. The lift mechanism is connected to between the light guiding rod and the base, such that the keycap can vertically move relative to the base through the lift mechanism. The light source is disposed between the light guiding rod and the base and emits light toward the light guiding rod. The light enters the light guiding rod through an end portion of the light guiding rod and then emits out the light guiding rod from another end portion of the light guiding rod and a side surface adjacent to the another end portion toward the cap body. Thereby, the whole cap body can receives relatively uniform back light.

14 Claims, 12 Drawing Sheets

(51) Int. Cl.
*H01H 1/24* (2006.01)
*H01H 3/42* (2006.01)

(52) U.S. Cl.
CPC .................. *H01H 1/24* (2013.01); *H01H 3/42* (2013.01); *H01H 2205/004* (2013.01); *H01H 2219/014* (2013.01); *H01H 2219/056* (2013.01); *H01H 2219/062* (2013.01); *H01H 2219/0621* (2013.01)

(56) References Cited

U.S. PATENT DOCUMENTS

| | | | | |
|---|---|---|---|---|
| 4,445,164 | A * | 4/1984 | Giles, III | H01H 13/023 200/314 |
| 4,831,223 | A * | 5/1989 | Wako | H01H 13/20 200/290 |
| RE33,422 | E * | 11/1990 | Garcia, Jr. | G06F 3/0202 250/229 |
| 6,743,993 | B1 * | 6/2004 | Clark | H01H 13/702 200/314 |
| 7,005,679 | B2 * | 2/2006 | Tarsa | H01L 25/0753 257/100 |
| 8,217,285 | B2 * | 7/2012 | Chang | H01H 13/7006 200/313 |
| 2014/0251778 | A1 * | 9/2014 | Izawa | H01H 13/023 200/533 |
| 2015/0043192 | A1 * | 2/2015 | Tanoue | H01H 9/161 362/23.03 |
| 2015/0062872 | A1 * | 3/2015 | Song | G02F 1/133603 362/97.1 |
| 2017/0011871 | A1 * | 1/2017 | Izawa | H01H 1/5805 |

FOREIGN PATENT DOCUMENTS

| | | |
|---|---|---|
| CN | 203339029 U | 12/2013 |
| CN | 204067119 U | 12/2014 |
| CN | 204884952 U | 12/2015 |
| TW | M500922 U | 5/2015 |

* cited by examiner

ILLUMINATED KEYSWITCH

BACKGROUND OF THE INVENTION

1. Field of the Invention

The invention relates to a keyswitch, and especially relates to an illuminated keyswitch with backlight.

2. Description of the Prior Art

There is a kind of illuminated keyswitches using a light source (which may be spot light or surface light) disposed below the keycap for producing backlight to the keycap. The backlight can be observed by a user outside the keyswitch through the periphery or a light-penetrable portion of the keycap, which results in an illumination effect (e.g. by which the user can know the position of the key) or an indication effect (e.g. by which the user can know the name of the key). In general, the light source (e.g. an LED component) is usually disposed on the base, so if there are other components (e.g. mechanism for moving the keycap up and down relative to the base) disposed between the keycap and the base, the light emitted by the light source toward the keycap will be interfered. In principle, only the portion (i.e. the light-penetrable portion) of the keycap right above the light source can be illuminated uniformly by the light and is usually located at the periphery of the keycap, usually at a side portion of the periphery. On the whole, only a specific portion of the keycap can receive sufficient and uniform light, which limits the structural design of the light-penetrable portion of the keycap (including the size and location thereof). Furthermore, when the keycap is replaced with a new one, the light-penetrable portion of the new keycap still needs to align with the light source so that the light-penetrable portion can be illuminated uniformly by the light from the light source. Therefore, in the structural configuration of the illuminated keyswitches, the light source provides illumination light only in a single direction so the keycap as a whole cannot be illuminated uniformly by the illumination light, which further limits the design of the light-penetrable portion of the keycap.

SUMMARY OF THE INVENTION

An objective of the invention is to provide an illuminated keyswitch. The illuminated keyswitch uses a light-guiding rod to guide light toward the bottom of the cap body of the keycap of the illuminated keyswitch to illuminate the cap body in multi-directions, so that the cap body as a whole can receive uniform illumination.

An illuminated keyswitch of an embodiment according to the invention includes a base, a keycap, a lift mechanism, and a light source. The keycap includes a cap body and a light-guiding rod. The cap body is disposed above the base and has a light-penetrable portion. The light-guiding rod is disposed between the base and the cap body and has a first end portion, a second end portion opposite to the first end portion, and a side surface adjacent to the second end portion. The light-guiding rod is connected to the cap body through the second end portion. The lift mechanism is connected to between the base and the light-guiding rod. The keycap is movable parallel to a direction toward or away from the base through the lift mechanism. The light source is disposed between the light-guiding rod and the base. The light source emits light toward the first end portion such that the light enters the light-guiding rod through the first end portion and emits out the light-guiding rod from the second end portion and the side surface toward the light-penetrable portion. Thereby, the light is guided by the light-guiding rod to the bottom of the cap body, which avoids interference from the lift mechanism with the light so that every portion of the cap body has a chance to receive the light. Furthermore, the light emits out the light-guiding rod from the second end portion and the side surface, i.e. emitting toward the cap body in multi-directions, which is conducive to the uniform illumination on the keycap.

Compared with the prior art, the illuminated keyswitch according to the invention uses the light-guiding rod to avoid influence of the lift mechanism on the light, so that every portion of the cap body has a chance to receive the light, so any portion of the cap body can be designed as a light-penetrable portion, of which the size is not limited in principle. Therefore, the illuminated keyswitch according to the invention can effectively solve the problem in the prior art that the travelling path of the light is limited so the design of the light-penetrable portion of the keycap also is limited.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
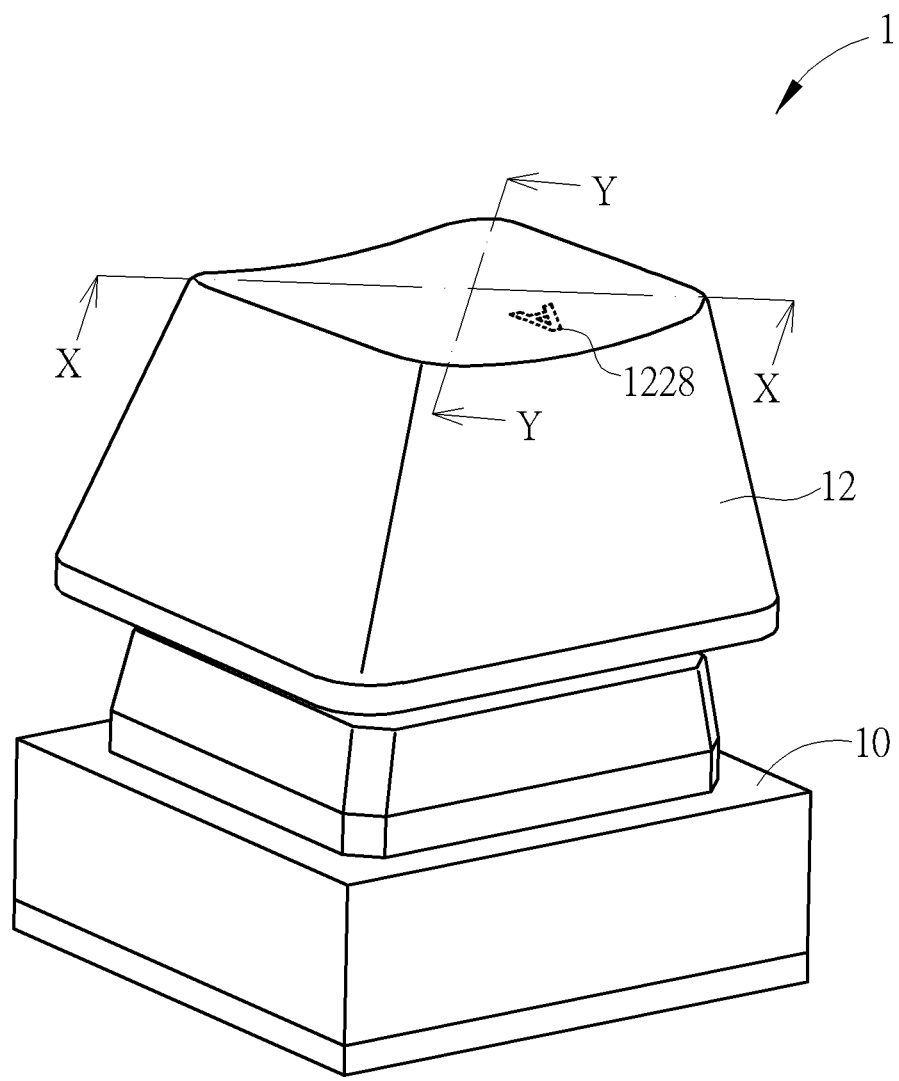
FIG. 1 is a schematic diagram illustrating an illuminated keyswitch of an embodiment according to the invention.

Please refer to FIG. 1 to FIG. 4. An illuminated keyswitch 1 of an embodiment according to the invention includes a base 10, a keycap 12, a lift mechanism 14, a light source 16, and a switch 18. The keycap 12 is disposed above the base 10. The lift mechanism 14 is disposed between the base 10 and the keycap 12, so that the keycap 12 is movable parallel to a direction D1 (indicated by an arrow in FIG. 3 and FIG. 4) toward or away from the base 10 through the lift mechanism 14. Therein, in the view point of FIG. 3 and FIG. 4, the direction D1 is equivalent to a vertical direction. In the embodiment, the lift mechanism 14 is but not limited to a spring. Therefore, when the keycap 12 is pressed to move toward the base 10 parallel to the direction D1, the lift mechanism 14 is also compressed and stores elastic energy accordingly. When the keycap 12 is no longer pressed, the stored elastic energy can be released so as to drive the keycap 12 to move away from the base 10 parallel to the direction D1 and return to its original position. The light source 16 is disposed in the base 10 and can emit light toward the keycap 12. For simple illustration, the internal structure of the light source 16 is not shown on the sectional views. The switch 18 is disposed on the base 10 and can be triggered by the keycap 12. In addition, in practice, the light source 16 and the switch 18 are connected to a circuit board 3 (represented by a rectangle in dashed lines in FIG. 3) in principle, which will not be described further in addition.

For more details, the keycap 12 includes a cap body 122 and a light-guiding rod 124. The cap body 122 is disposed above the base 10. The light-guiding rod 124 is disposed between the base 10 and the cap body 122 and has a first end portion 1242, a second end portion 1244 opposite to the first end portion 1242, and a side surface 1246 adjacent to the second end portion 1244. The light-guiding rod 124 is connected to the cap body 122 through the second end portion 1244. The lift mechanism 14 is connected to between the base 10 and the light-guiding rod 124. The first end portion 1242 of the light-guiding rod 124 abuts against the lift mechanism 14. The light source 16 is located between the light-guiding rod 124 and the base 10. The light source 16 emits light toward the first end portion 1242, so that the light enters the light-guiding rod 124 through the first end portion 1242 and emits out of the light-guiding rod 124 through the second end portion 1244 and the side surface 1246 toward the cap body 122.

In the embodiment, the cap body 122 includes a top portion 1222 and a circumferential portion 1224 surrounding and being connected to the top portion 1222. The top portion 1222 and the circumferential portion 1224 form an accommodating space 1226. That is, the cap body 122 broadly shows a cover structure (or a bowl structure with a downward opening); the second end portion 1244 and the side surface 1246 are located in the accommodating space 1226. Therefore, to the cap body 122, the second end portion 1244 and the side surface 1246 of the light-guiding rod 124 as a whole is equivalent to a light source. The light-guiding rod 124 entering the accommodating space 1226 can illuminate the whole cap body 122, so that the illumination uniformity of the light on the cap body 122 is good. Therein, the side surface 1246 is an annular surface which has a little taper but substantially shows a cylindrical surface; however, the invention is not limited thereto. For example, the side surface 1246 is defined not to surround the second end portion 1244 completely and can be a single partial surface or a ground of several partial surfaces. Furthermore, in the embodiment, the cap body 122 includes a light-penetrable portion 1228 disposed on the top portion 1222. The location of the light-penetrable portion 1228 is shown by dashed lines only in FIG. 1 and FIG. 2 and is skipped in the other figures for simplification of the drawings. The light passes through the light-penetrable portion 1228 and then can be observed outside the illuminated keyswitch 1 leading to a visual indication effect. In practice, the light-penetrable portion 1228 can be provided by a keycap with a light-penetrable structure of a conventional illuminated keyswitch, which will not be described further. In practice, the profile of the light-penetrable portion 1228 can be a number (as shown in FIG. 1), a character and so on. Because the entire cap body 122 can receive light, the disposition of the light-penetrable portion 1228 is not limited and can be at the center of the top portion 1222, the circumferential portion 1224, or both. Even it is practicable that the whole cap body 122 is light-penetrable (i.e. the whole cap body 122 is the light-penetrable portion 1228), e.g. a single structure made of light-penetrable material.

Figure 3:
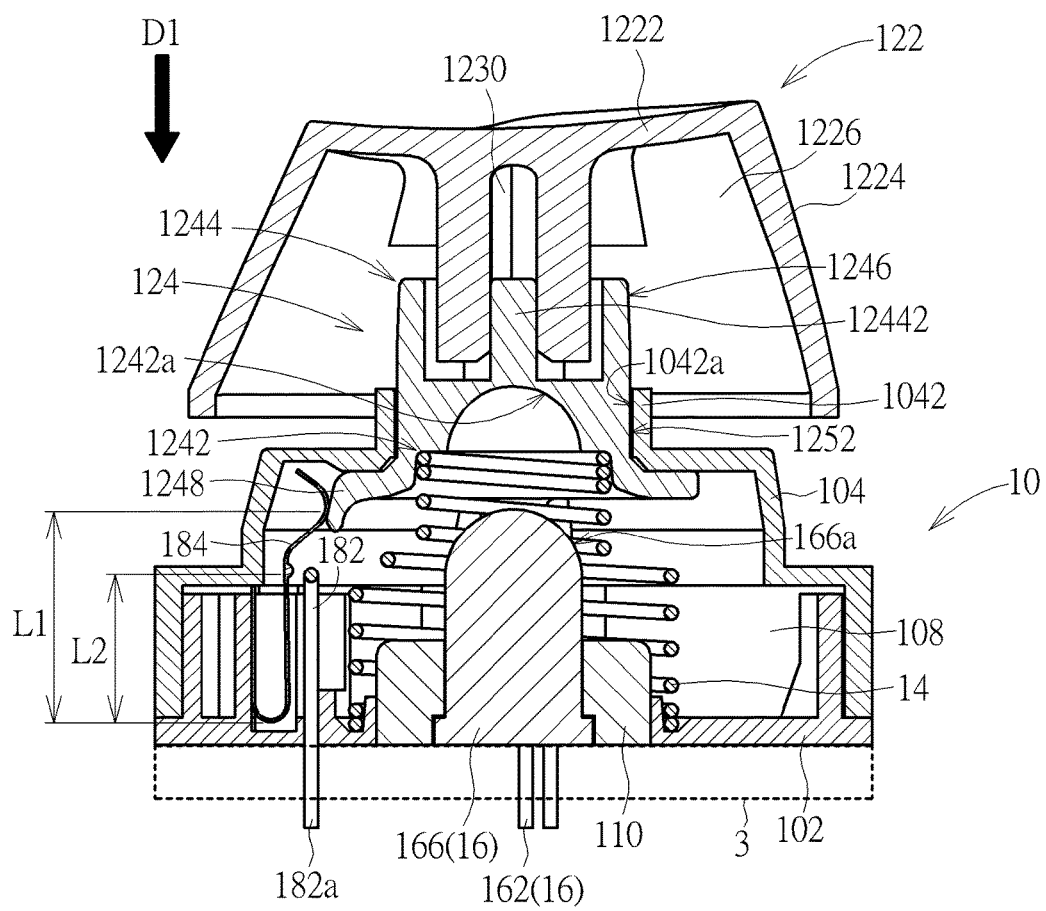
FIG. 3 is a sectional view of the illuminated keyswitch in FIG. 1 along the line X-X.
Figure 5:
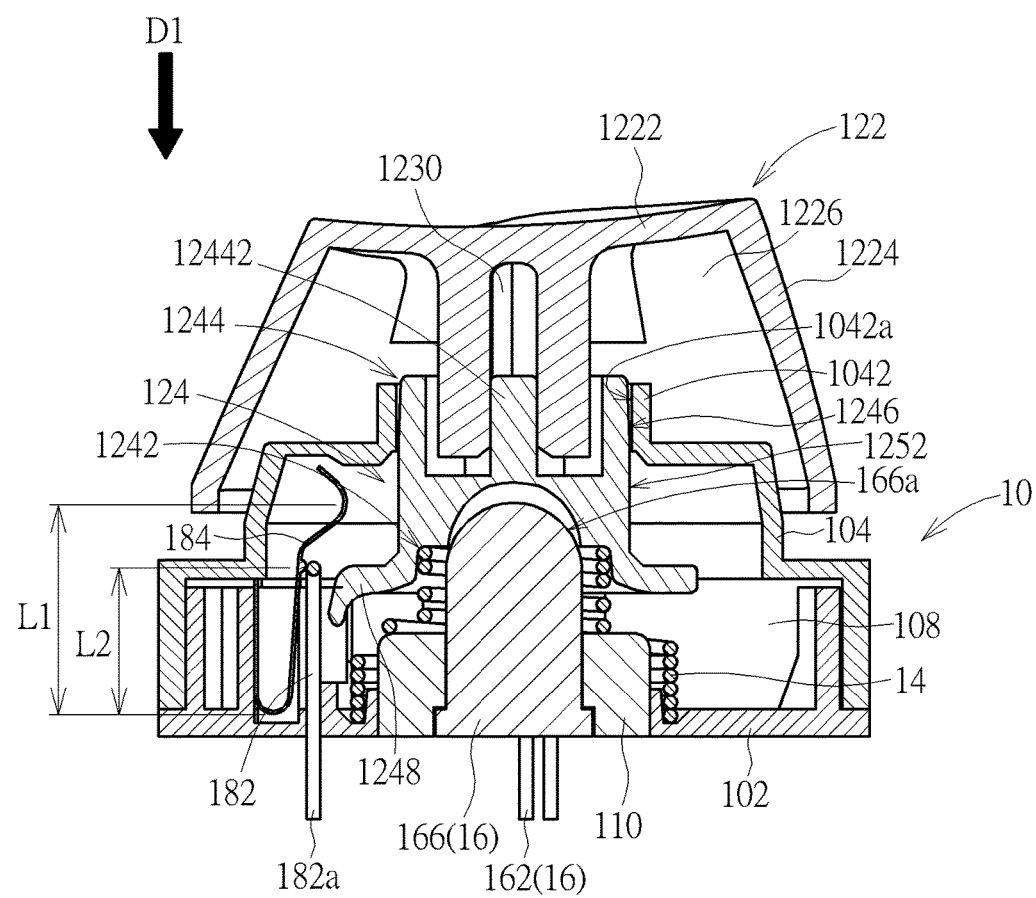
FIG. 5 is a sectional view of the illuminated keyswitch in FIG. 3 when a keycap thereof is pressed.

Please also refer to FIG. 5. In the embodiment, the switch 18 includes a fixed contacting part 182 and a movable contacting part 184 oppositely disposed. Therein, the fixed contacting part 182 is fixed directly on the base 10. The fixed contacting part 182 is formed by bending and extending upward an end of the spring (i.e. the lift mechanism 14) abutting the base 10. The movable contacting part 184 also is fixed on the base 10 and shows a cantilever structure; however, the invention is not limited thereto. For example, the fixed contacting part 182 can be fixed on the base 10 independent of the spring. The movable contacting part 184 can be provided by other elastic structures. Even the switch 18 can be provided by a common switch tact switch. Furthermore, in the embodiment, a connection end 182a of the fixed contacting part 182 and a connection end 184a of the movable contacting part 184 pass through the base 10 to be electrically connected to the circuit board 3 (as shown by FIG. 3). Thereby, the open or close action of the switch 18 can be detected by the circuit board 3. Furthermore, the portion of the fixed contacting part 182 that contacts the movable contacting part 184 can be treated by a surface treatment (e.g. nickel or gold plating) for enhancement of the fatigue resistivity of the switch 18. The light-guiding rod 124 includes a triggering portion 1248 at the first end portion 1242 for triggering the switch 18. When the keycap 12 is not pressed yet, the keycap 12 is at an initial position (as shown by FIG. 3). The triggering portion 1248 pushes against the movable contacting part 184 such that the movable contacting part 184 and the fixed contacting part 182 are separate; that is, the switch 18 is open at the moment. Furthermore, at this moment, the movable contacting part 184 is pushed by the triggering portion 1248 and then elastically deforms. That is, when the keycap 12 is at the initial position, the movable contacting part 184 has been pressed in advance. When the keycap 12 is pressed to move toward the base 10 over a distance (as shown by FIG. 5, in which the keycap 12 has moved over the distance and reaches a pressed position), the triggering portion 1248 departs from the movable contacting part 184 so that the movable contacting part 184 springs back due to a resilient force to contact the fixed contacting part 182; at the moment, the switch 18 is conducted.

In addition, in the embodiment, the movable contacting part 184 as a whole shows a U-shaped structure (with an upward opening). Relative to the deflection pivot of the movable contacting part 184, the position at which the triggering portion 1248 contacts the movable contacting part 184 (corresponding to a distance L1) is farther than the position at which the fixed contacting part 182 contacts the movable contacting part 184 (corresponding to a distance L2) (i.e. the distance L1 is longer than the distance L2), so even if the position at which the triggering portion 1248 contacts the movable contacting part 184 may vary (e.g. when the light-guiding rod 124 slightly obliquely moves up and down relative to the direction D1), the influence of the variation on the contacting position of the movable contacting part 184 and the fixed contacting part 182 is still reduced. In other words, in the embodiment, the disposition of the switch 18 and the triggering portion 1248 is conducive to enhancement of the tolerance of the assembly or operation of the illuminated keyswitch 1.

Figure 6:
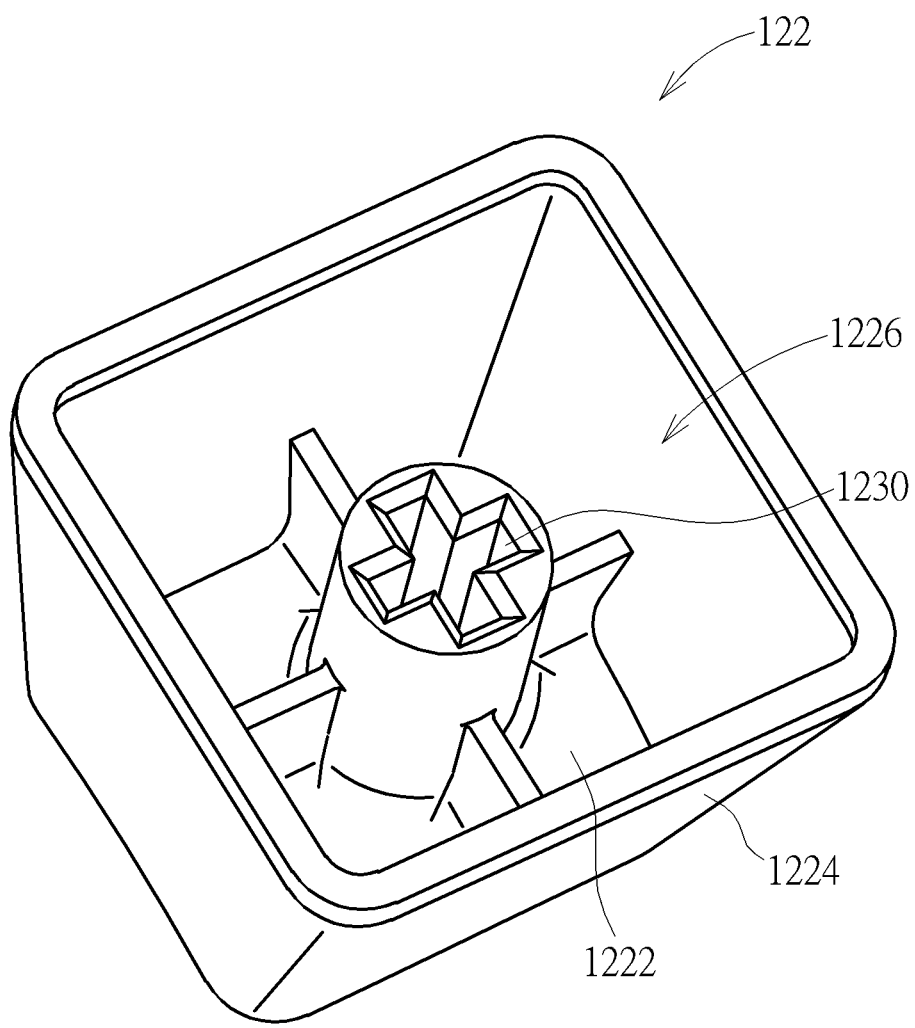
FIG. 6 is a schematic diagram illustrating the keycap of the illuminated keyswitch in FIG. 2 in another view point.

Please also refer to FIG. 6. In the embodiment, the cap body 122 includes a first engagement structure 1230 on the bottom surface of the top portion 1222 and in the accommodating space 1226. Correspondingly, the second end portion 1244 of the light-guiding rod 124 has a second engagement structure 12442. The first engagement structure 1230 matches the second engagement structure 12442, so that the first engagement structure 1230 can be engaged with the second engagement structure 12442 stably. In the embodiment, the first engagement structure 1230 and the second engagement structure 12442 are detachably engaged, so in practice, the cap body 122 of the keycap 12 is replaceable. Because the whole cap body 122 can receive light, a new cap body can be provided with a different light-penetrable portion (including the location and its profile) in principle. In practice, the illuminated keyswitch 1 can allow a user to use his favorite cap bodies, as long as the cap bodies are capable of engaged with the second engagement structure 12442. Furthermore, in the embodiment, the first engagement structure 1230 includes a cross socket, and the second engagement structure 12442 includes a cross rod, so the first engagement structure 1230 and the second engagement structure 12442 can be easily engaged; however, the invention is not limited thereto. For example, the cross socket is replaced with an inner sawtoothed socket (i.e. a plurality grooves formed on the inner surface, the quantity of the grooves being a multiple of four) or a polygon socket with a multiple of four sides, and the cross rod is modified to be capable of engaging with the inner sawtoothed socket, so that the modified cross rod can be engaged with the inner sawtoothed socket in different angles (relative to the base 10) by request. For other examples, the engagement of the first engagement structure 1230 and the second engagement structure 12442 can be achieved by other geometric structures capable of engaging with each other, which also leads to detachable engagements.

Figure 7:
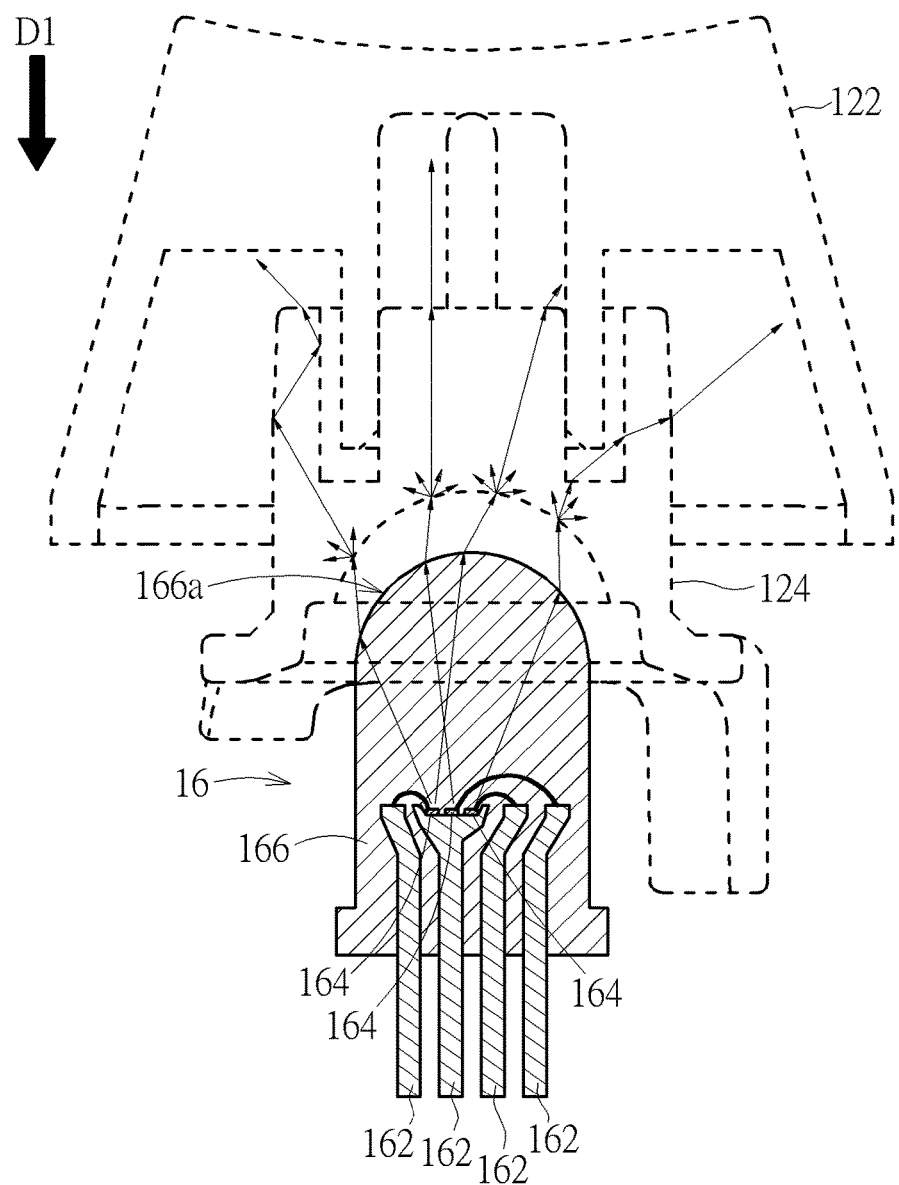
FIG. 7 is a sectional view of a light source of the illuminated keyswitch in FIG. 2 along the line Z-Z.

In the embodiment, the first end portion 1242 of the light-guiding rod 124 and the light source 16 are matched in structure, so that the light emitted by the light source 16 can mostly enter the light-guiding rod 124 and emit out of the light-guiding rod 124 from the second end portion 1244 and the side surface 1246 of the light-guiding rod 124 under the guiding effect of the light-guiding rod 124. Please also refer to FIG. 7; therein, the sectional profiles of the cap body 122 and the light-guiding rod 124 are shown in dashed lines in FIG. 7. In the embodiment, the light source 16 includes four electrode pins 162, three light-emitting units (which are achieved by light-emitting chips 164 in the embodiment), and a sealant 166. The three light-emitting chips 164 are fixed disposed, electrically connected to one of the electrode pins 162, and electrically connected to the other three electrode pins 162 respectively. The sealant 166 is used not only for fixing the above components but also for performing optical functions (e.g. condensing light in the embodiment). The light source 16 is disposed on the base 10 by the sealant 166. The light source 16 is electrically connected to the circuit board 3 through the four electrode pins 162 (as shown in FIG. 3). In the embodiment, the sealant 166 has a light-out convex surface 166a. The first end portion 1242 has a concave surface 1242a. The light-out convex surface 166a and the concave surface 1242a match each other and are disposed oppositely. The light emitted by the light source 16 emits out from the light-out convex surface 166a and enters the light-guiding rod 124 through the concave surface 1242a; therein, the traveling path of the light is shown by thin lines with arrows in FIG. 7. The light-guiding rod 124 can mix light inside the light-guiding rod 124, so if the light can enter the light-guiding rod 124 in more directions, it enhances the light mixing. In the embodiment, the concave surface 1242a has a rough surface or a surface microstructure (not shown in figures because the size thereof is relatively small), which is conducive to scattering the light so that the light can enter the light-guiding rod 124 in more directions. Furthermore, if the light can emit out of the light-guiding rod 124 in more directions, it is also conducive to uniform illumination on the cap body 122. In the embodiment, the second end portion 1244 and the side surface 1246 respectively have a rough surface or a surface microstructure (not shown in the figures), which is conducive to scattering the light so that the light can emit out of the light-guiding rod 124 in more directions and is also conducive to the internal total reflection of the light in the light-guiding rod 124 so as to enhance the light mixing. Furthermore, in practice, without other considerations, the light-guiding rod 124 can be a single structure made of a light-penetrable material and all outer surfaces are rough surfaces or provided with a surface microstructure thereon, so that the light inside the light-guiding rod 124 can make the light-guiding rod 124 as a whole like a lighting member.

Figure 8:
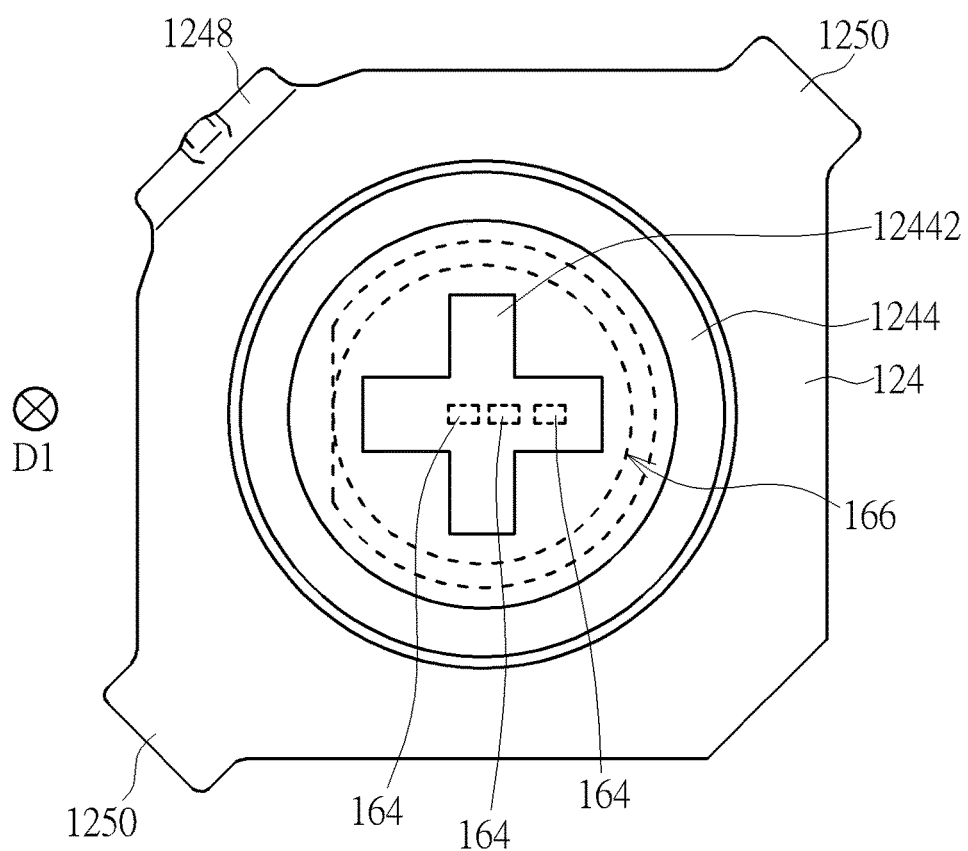
FIG. 8 is a top view of a light-guiding rod and the light source of the illuminated keyswitch in FIG. 1 for illustrating the disposition relation thereof.

In the embodiment, the light-guiding rod 124 shows a solid structure. The light inside the light-guiding rod 124 may reflect off particles (e.g. impurities) if the particles exist, which also enhances the light mixing. In principle, the light emitted by the light-emitting chips 164 has a stronger intensity in the emitting direction of the light-emitting chips 164 (i.e. substantially the direction D1 in the embodiment). If the light emitted in this direction can be guided to travel for a longer distance in the light-guiding rod 124, it can reduce the intensity of the light emitted out from the light-guiding rod 124 in this direction and also enhance the mixing of the light inside the light-guiding rod 124 and the uniformity of the illumination on the cap body 122. Please also refer to FIG. 8. In the embodiment, projections of the light-emitting chips 164 in the direction D1 and a projection of the cross rod (of the second engagement structure 12442) in the direction D1 overlap. More precisely, the projections of the light-emitting chips 164 in the direction D1 are located within the projection of the cross rod in the direction D1.

Figure 9:
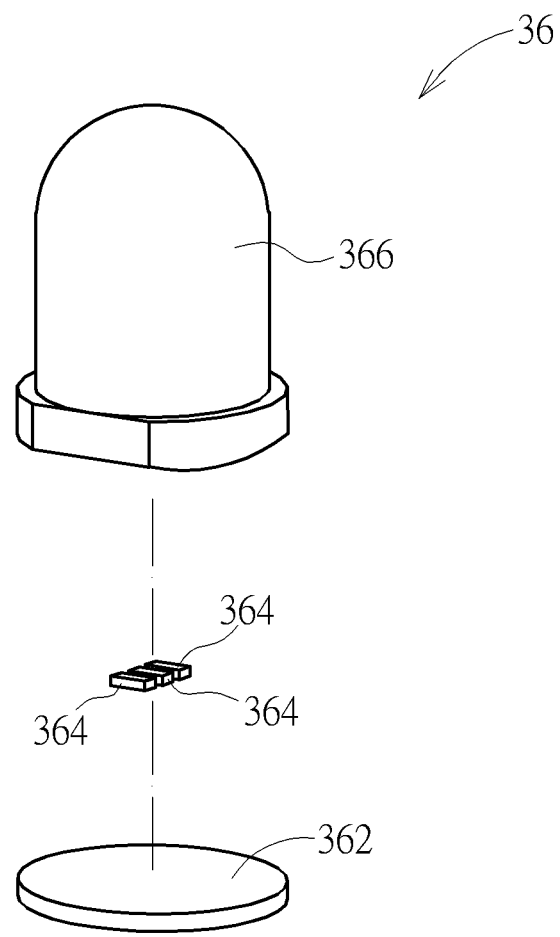
FIG. 9 is a schematic diagram illustrating a light source according to another embodiment.

In addition, in the embodiment, the light source 16 is achieved by a plug-in LED; however, the invention is not limited thereto. Please refer to FIG. 9 which is a schematic diagram illustrating a light source 36 according to another embodiment. The light source 36 includes a circuit substrate 362, three light-emitting units (which are achieved by SMD LEDs 364 in the embodiment), and a lens 366. The LEDs 364 are fixed and electrically connected onto the circuit substrate 362. The lens 366 is disposed above the LEDs 364 for providing optical modulation to the light emitted by the LEDs 364. The light source 36 is electrically connected to the circuit board (as shown in FIG. 3) through the circuit substrate 362. In the embodiment, the outline of the lens 366 is substantially equivalent to the outline of the sealant 166 of the light source 16, so if the light source 36 replaces the light source 16 and is assembled to the illuminated keyswitch 1, the travelling path of the light emitted by the light source 36 is substantially equivalent to the travelling path of the light emitted by the light source 16. Therefore, for descriptions about the travelling path of the light emitted by the light source 36, please refer to the relevant descriptions (and FIG. 7) of the travelling path of the light emitted by the light source 16, which will not be repeated in addition. Furthermore, in the embodiment, the lens 366 is not mainly used to fix the LEDs 364, so in practice the light source 36 is not limited to be provided with the lens 366. The light emitted by the LEDs 364 can directly enter the light-guiding rod 124. In the embodiment, although the light source 36 uses separate LEDs 364, each LED 364 has a respective carrier (including a lead frame) and a respective sealant sealing the light-emitting chip therein; however, the invention is not limited thereto. For example, the light source 36 uses a single SMD LED having three light-emitting chips, and the sealant thereof (packing the three light-emitting chips) is formed to be with a bulgy appearance so that the sealant also performs optical effect of a lens.

Figure 2:
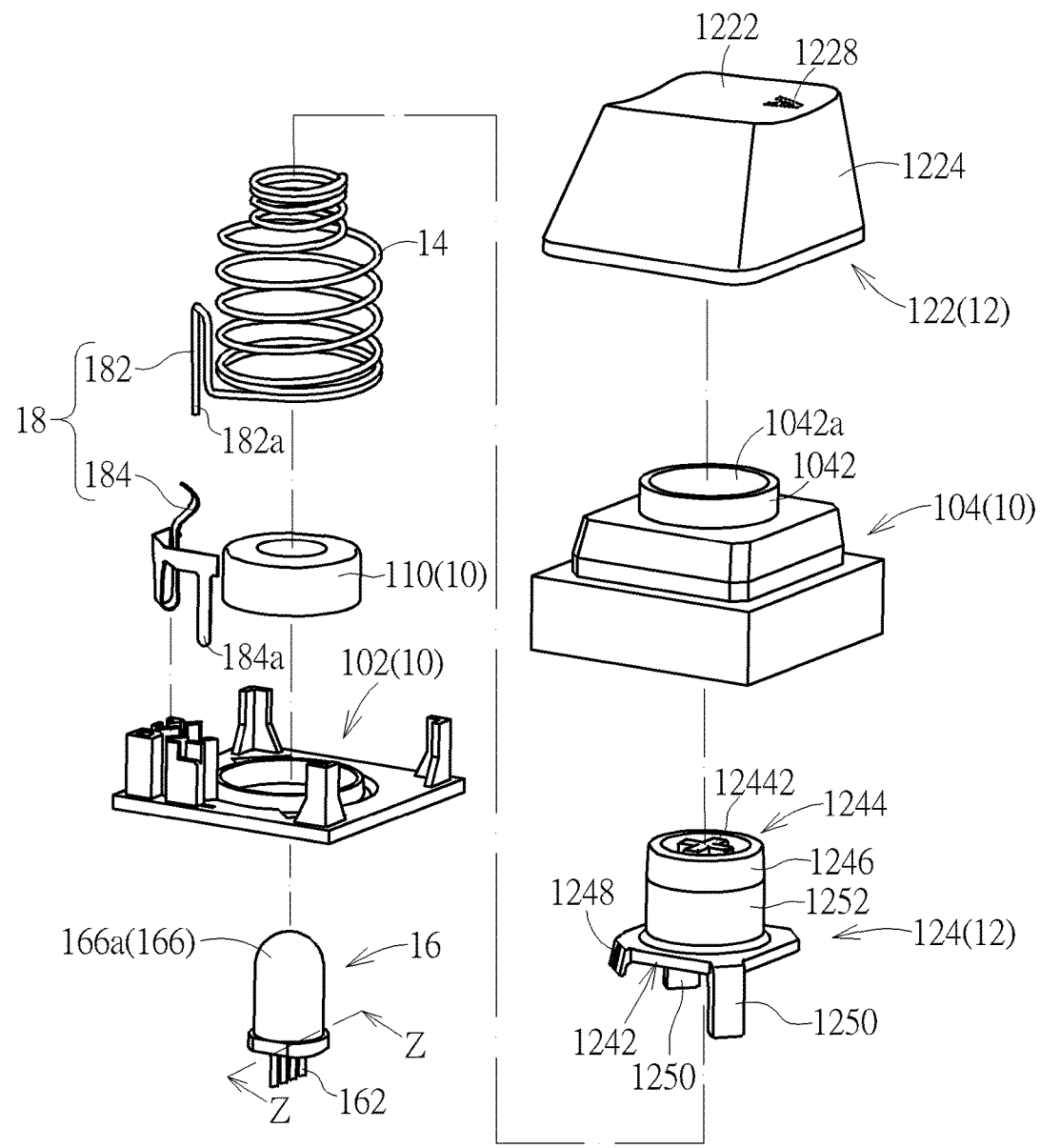
FIG. 2 is an exploded view of the illuminated keyswitch in FIG. 1.
Figure 4:
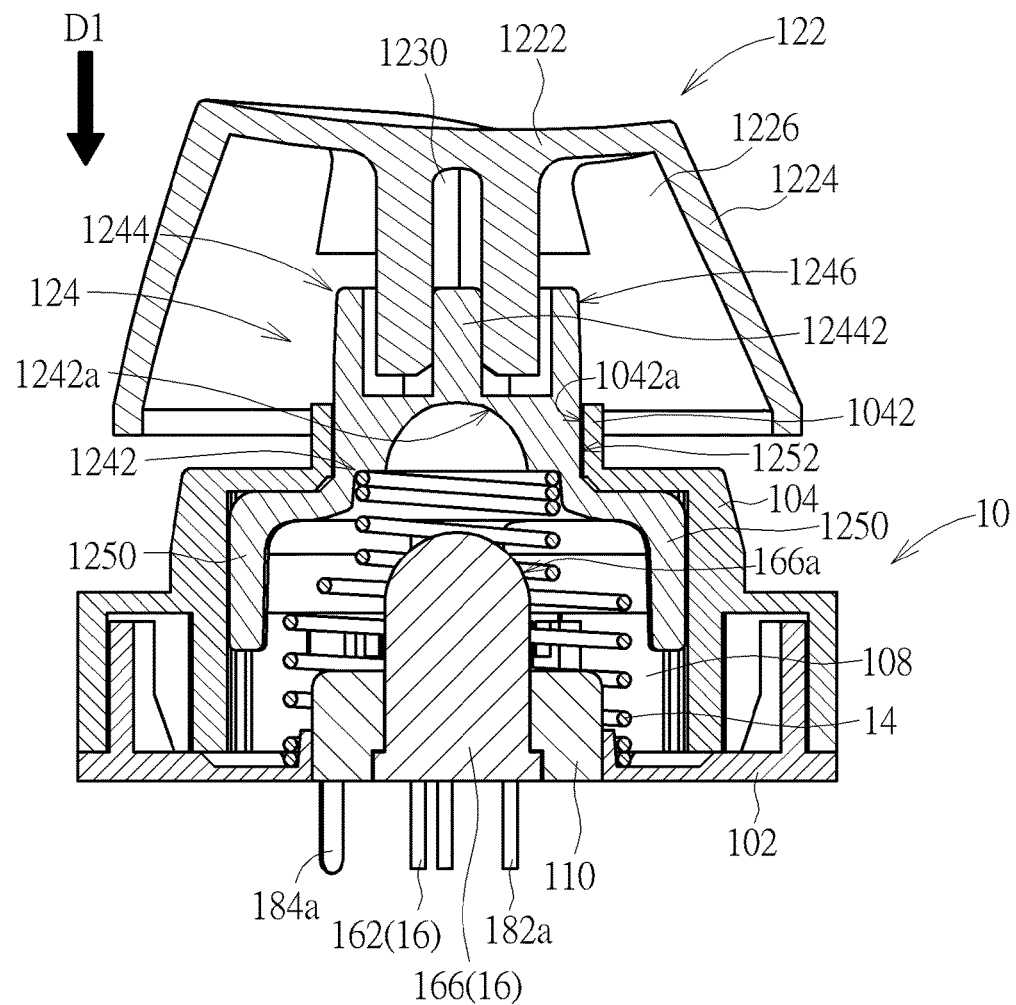
FIG. 4 is a sectional view of the illuminated keyswitch in FIG. 1 along the line Y-Y.
Figure 10:
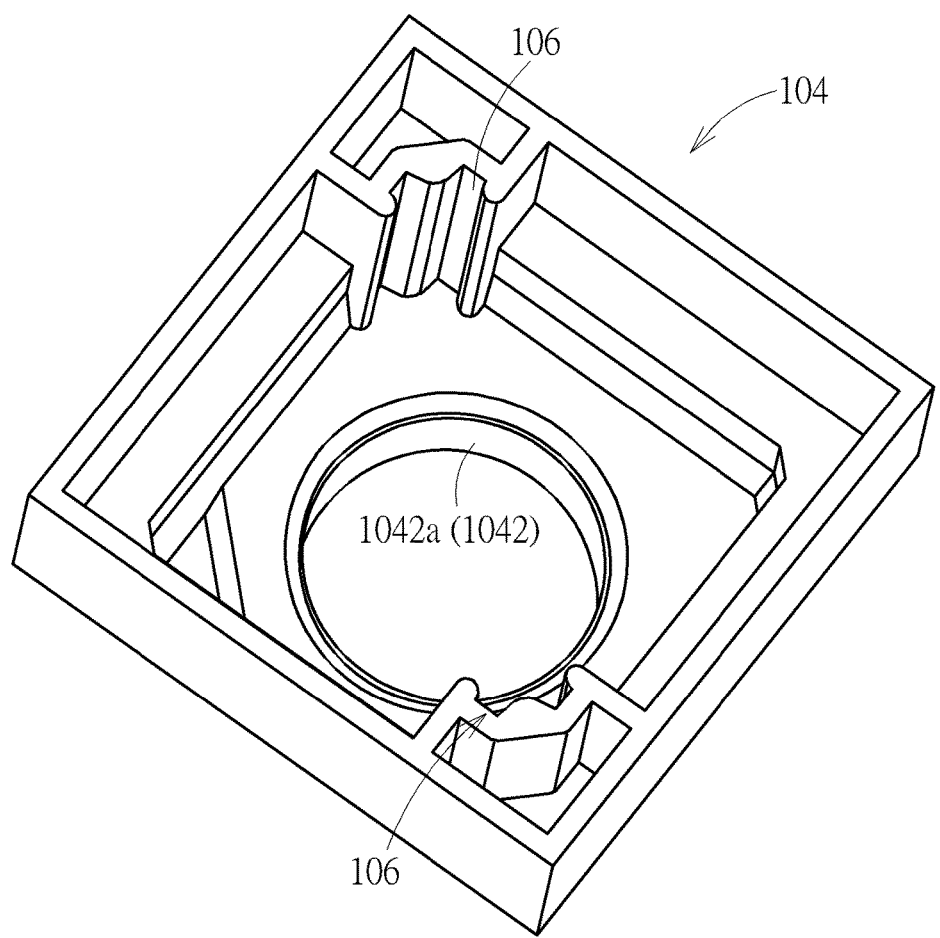
FIG. 10 is a schematic diagram illustrating an upper cover of the illuminated keyswitch in FIG. 2 in another view point.

Please return to the embodiment shown by FIG. 1 (also referring to FIG. 1 to FIG. 8). In the embodiment, the light-guiding rod 124 and the base 10 have a relatively slidable engagement therebetween. As shown by FIG. 2 to FIG. 4, the light-guiding rod 124 includes a sliding structure 1250. The sliding structure 1250 is located at the first end portion 1242. The base 10 includes a lower plate 102, an upper cover 104, and a guiding slot structure 106. The upper cover 104 and the lower plate 102 engage with each other to form an accommodating space 108. The guiding slot structure 106 is located in the accommodating space 108. The light source 16 is disposed on the base 10 through a boss 110 disposed on the lower plate 102 and extends into the accommodating space 108. Please refer to FIG. 10. In the embodiment, the guiding slot structure 106 is disposed on the upper cover 104 and, for example, can be directly structurally integrated with the upper cover 104. However, the invention is not limited thereto. For example, the guiding slot structure 106 is disposed on the lower plate 102 and even is structurally integrated with the lower plate 102. The upper cover 104 has a plunger sleeve 1042. The light-guiding rod 124 is slidably inserted into the plunger sleeve 1042, so that the first end portion 1242 is located in the accommodating space 108 and the sliding structure 1250 is slidably disposed in the guiding slot structure 106. In the embodiment, the sliding structure 1250 includes two sliders oppositely disposed on the first end portion 1242. The guiding slot structure 106 includes two guiding slots oppositely disposed. The two sliders are slidably disposed in the guiding slots respectively. However, the invention is not limited thereto. Furthermore, from the view point on the vertical projection of the illuminated keyswitch 1 as a whole, the illuminated keyswitch 1 as a whole shows a square profile. The sliding structure 1250 and the guiding slot structure 106 are located at two opposite corners. The triggering portion 1248 is located at one of the other opposite corners. Because the portion of the light-guiding rod 124 that slidably engages with the upper cover 104 shows a circle, the illuminated keyswitch 1 can provide relatively large spaces at the corners for disposing the sliding structure 1250, the guiding slot structure 106, and the triggering portion 1248 therein.

In addition, in the embodiment, the light-guiding rod 124 has a smooth side surface 1252 which slidably contacts a smooth inner surface 1042a of the plunger sleeve 1042. Therein, the smooth side surface 1252 is an exact circle. In practice, the smooth side surface 1252 and the side surface 1246 can be regarded as a cylinder surface and can occupy different areas by designing the action of the illuminated keyswitch 1. In the embodiment, when the keycap 12 is at the pressed position (as shown by FIG. 5), the side surface 1246 also enters the plunger sleeve 1042. By the smooth contact of the smooth side surface 1252 with the inner surface 1042a, the slidably contact friction between the light-guiding rod 124 and the plunger sleeve 1042 can be reduced, which not only reduces the abrasion between the light-guiding rod 124 and the plunger sleeve 1042 but also enhances the sliding stability of the light-guiding rod 124 in the plunger sleeve 1042. However, the invention is not limited thereto. For example, all the outer surfaces of the light-guiding rod 124 are rough surfaces or provided with a surface microstructure thereon. Because the rough surface and the surface microstructure belong to micro-structures, they look smooth in a macroscopic view, so that the light-guiding rod 124 still can slidably engage with the plunger sleeve 1042 through the outer surfaces of the light-guiding rod 124.

In addition, in the embodiment, the light-guiding rod 124 and the upper cover 104 respectively are a single structure made of light-penetrable material; in other words, they are light-penetrable so that the light-guiding rod 124 and the upper cover 104 as a whole can be visually regarded as a lighting source (of which the light comes from the light source 16 disposed in the accommodating space 108), which is conducive to enhancement of the uniformity of the illumination of the cap body 122 and further provides illumination on the periphery the cap body 122. Furthermore, the lift mechanism 14 is also disposed in the accommodating space 108 and will not influence the illumination on the cap body 122; in other words, the illumination effect of the illuminated keyswitch 1 according to the invention is not influenced by the lift mechanism 14. Furthermore, in the illuminated keyswitch 1 according to the invention, the structures that do not light (e.g. the light-guiding rod 124 and upper cover 104 that perform supporting and movement guiding) also can transfer light so as not to affect the illumination on the cap body 122. However, the invention is not limited to that the upper cover 104 is light-penetrable. For example, when the upper cover 104 is not light-penetrable, the upper cover 104 can perform a covering effect, which makes the light emitted from the light-guiding rod 124 mainly emit toward the cap body 122 leading to a reduction of light leakage from the fringe of the cap body 122 and facilitates different product designs. However, in practice, the illuminated keyswitch 1 according to the invention also can be designed for slight light leakage from the fringe of the cap body 122 for different visual effects.

Figure 11:
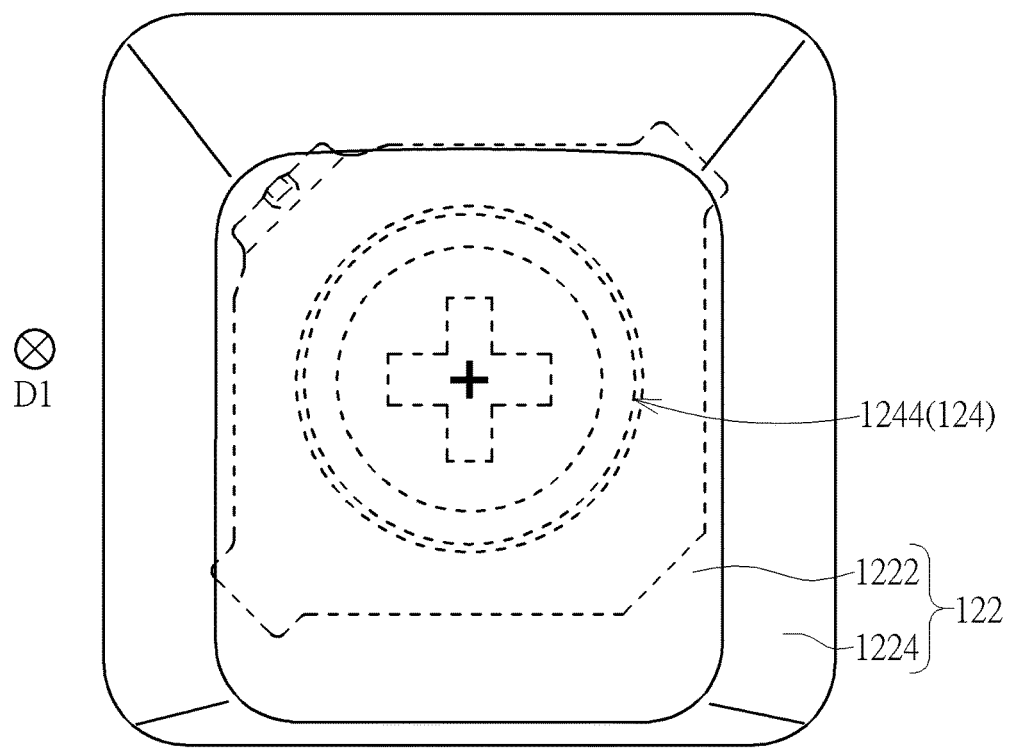
FIG. 11 is a schematic diagram illustrating vertical projections of the light-guiding rod and the cap body of the illuminated keyswitch in FIG. 1.
Figure 12:
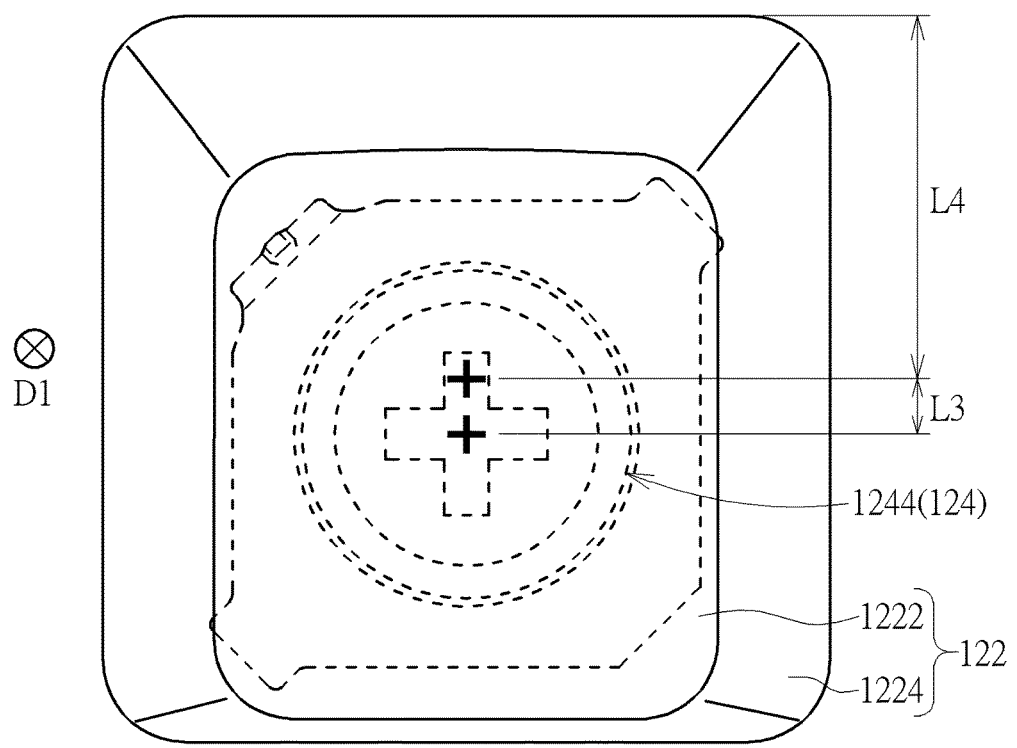
FIG. 12 is a schematic diagram illustrating vertical projections of the light-guiding rod and the cap body according to another embodiment.

As discussed above, the illuminated keyswitch 1 according to the invention uses the light-guiding rod 124 to guide the light emitted by the light source 16 toward the cap body 122; therein, the light source 16 is disposed in the central portion of the lift mechanism 14 (i.e. the spring sleeving on the light source 16 and the boss 110). Therefore, the interference from the lift mechanism 14 is avoided. In the embodiment, the light source 16 and the light-guiding rod 124 are even disposed in the central portion of the illuminated keyswitch 1 without consideration to the interference from the lift mechanism 14. Please refer to FIG. 11, which is a schematic diagram illustrating vertical projections of the cap body 122 and the light-guiding rod 124; therein, the view plane of FIG. 11 is regarded as a reference plane perpendicular to the direction D1. The projection of the cap body 122 on the reference plane is shown by solid lines (includes the outline of the projection of the whole cap body 122 and the outline of the projection of the top portion 1222). The projection of the light-guiding rod 124 on the reference plane is shown by dashed lines (including the outline of the projection of the whole light-guiding rod 124 and the outline of the projection of the second end portion 1244). In the embodiment, the geometric center of the projection of the cap body 122 and the geometric center of the projection of the second end portion 1244 substantially coincide (therefore, the two geometric centers being indicated by a single bold cross mark in FIG. 11); the projection of the second end portion 1244 is located at the central portion of the projection of the top portion 1222. The substantially coinciding includes cases that users can hardly be conscious of the difference between the positions of the two geometric centers. However, the invention is not limited thereto. For example, in practice, the two geometric centers may be separate from each other by a distance which the user can be conscious of, but for the top portion 1222, the projection of the second end portion 1244 may still be located within a relatively central portion of the projection of the top portion 1222, so that the cap body 122 still can receive uniform illumination in a certain degree. Please refer to FIG. 12, which is a schematic diagram illustrating vertical projections of the cap body 122 and the light-guiding rod 124 according to another embodiment; therein, the notice for the reading of FIG. 12 is the same as for the reading of FIG. 11 and will not be repeated. In the embodiment, a distance L3 between the geometric center of the projection of the second end portion 1244 and the geometric center of the projection of the cap body 122 is less than a fifth of a minimum distance L4 from the geometric center of the projection of the cap body 122 to the periphery of the projection of the cap body 122; therein, in practice, the ration of the distance L3 to the distance L4 is not limited to one fifth. Furthermore, in FIG. 12, the geometric center of the projection of the second end portion 1244 deviates from the geometric center of the projection of the cap body 122, but is relatively close to the center of the projection of the top portion 1222; in this case, the light emitting out of the second end portion 1244 illuminates the top portion 1222 more uniform.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An illuminated keyswitch, comprising:
   a base;
   a keycap, comprising a cap body and a light-guiding rod, the cap body being disposed above the base and having a light-penetrable portion, the light-guiding rod being disposed between the base and the cap body and having a first end portion, a second end portion opposite to the first end portion, and a side surface adjacent to the second end portion, the light-guiding rod being connected to the cap body through the second end portion;
   a lift mechanism, connected to between the base and the light-guiding rod, the keycap moving parallel to a direction toward or away from the base through the lift mechanism; and
   a light source, disposed between the light-guiding rod and the base, the light source emitting light toward the first end portion such that the light enters the light-guiding rod through the first end portion and emits out from the second end portion and the side surface toward the light-penetrable portion;
   wherein the light source has a light-out convex surface, the first end portion has a concave surface, the concave surface and the light-out convex surface match each other and are disposed oppositely, the light emitted by the light source emits out from the light-out convex surface and enters the light-guiding rod through the concave surface, the concave surface forms a release space, and when the keycap is pressed down, the light source relatively moves into the release space.

2. The illuminated keyswitch of claim 1, wherein the cap body comprises a top portion and a circumferential portion connected to around the top portion, the top portion and the circumferential portion form an accommodating space, and the second end portion and the side surface are located in the accommodating space.

3. The illuminated keyswitch of claim 2, wherein a geometric center of a projection of the second end portion on a reference plane and a geometric center of a projection of the cap body on the reference plane substantially coincide, and the reference plane is perpendicular to the direction.

4. The illuminated keyswitch of claim 2, wherein a distance between a geometric center of a projection of the second end portion on a reference plane and a geometric center of a projection of the cap body on the reference plane is less than one fifth of a minimum distance from the geometric center of the projection of the cap body to a periphery of the projection of the cap body, and the reference plane is perpendicular to the direction.

5. The illuminated keyswitch of claim 2, wherein the light-penetrable portion is located at the circumferential portion.

6. The illuminated keyswitch of claim 1, wherein the concave surface has a rough surface or a surface microstructure.

7. The illuminated keyswitch of claim 1, wherein the second end portion and the side surface respectively have a rough surface or a surface microstructure.

8. The illuminated keyswitch of claim 1, wherein the cap body has a first engagement structure, the second end portion has a second engagement structure, and the first engagement structure and the second engagement structure are detachably engaged with each other.

9. The illuminated keyswitch of claim 8, wherein the second engagement structure has a cross rod, the light source comprises a plurality of light-emitting units, projections of the light-emitting units in the direction and a projection of the cross rod in the direction overlap.

10. The illuminated keyswitch of claim 9, wherein the projections of the light-emitting units in the direction are located within the projection of the cross rod in the direction.

11. The illuminated keyswitch of claim 1, wherein the light-guiding rod comprises a sliding structure, the sliding structure is located at the first end portion, the base comprises a lower plate, an upper cover, and a guiding slot structure, the upper cover and the lower plate are engaged to form an accommodating space, the guiding slot structure is located in the accommodating space, the upper cover has a plunger sleeve, and the light-guiding rod is slidably inserted into the plunger sleeve, such that the first end portion is located in the accommodating space and the sliding structure is slidably disposed in the guiding slot structure.

12. The illuminated keyswitch of claim 11, wherein the light-guiding rod has a smooth side surface, and the smooth side surface slidably contacts a smooth inner surface of the plunger sleeve.

13. The illuminated keyswitch of claim 11, wherein the light-guiding rod and the upper cover respectively are a single structure made of light-penetrable material.

14. The illuminated keyswitch of claim 1, wherein the light-guiding rod is a single structure made of light-penetrable material.

* * * * *